Aug. 17, 1948.  S. D. MOORE  2,447,420
PLASTIC COATED ARTICLE
Filed Sept. 29, 1945
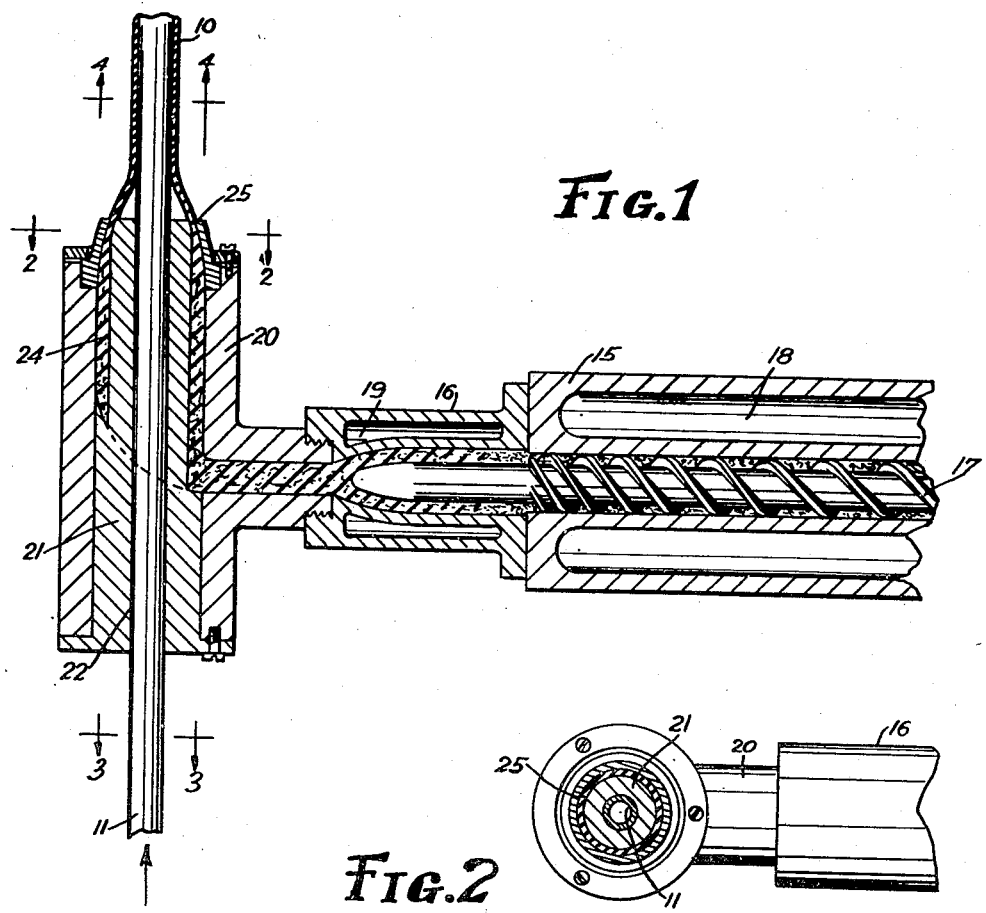
Fig.1
Fig.2
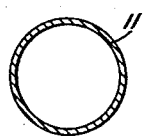
Fig.3
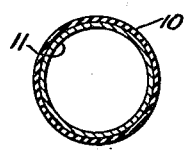
Fig.4
INVENTOR.
SAMUEL D. MOORE
BY
Bates, Teare, y McBean
ATTORNEYS Patented Aug. 17, 1948

2,447,420

UNITED STATES PATENT OFFICE 2,447,420

PLASTIC COATED ARTICLE

Samuel D. Moore, Mantua, Ohio, assignor to Samuel Moore & Company, Cleveland, Ohio, a corporation of Ohio Application September 29, 1945, Serial No. 619,331

2 Claims. (Cl. 138—68)

This invention relates to an article such as a tube or bar that is used for example as a stanchion or supporting rod in various forms of transportation vehicles and that has a coating of plastic material, such as cellulose acetate thereon. The invention is not limited to stanchions, but is of general application wherever an elongated article is covered with a coating of plastic material.

Supporting bars, such as stanchions, usually are metallic tubes one inch in diameter and are frequently bent to conform to the curvature requirements of a supporting surface, and are usually given a protective coating of paint or baked enamel after the bending operation has been completed. Such protective materials, however, have been objectionable because they have had a tendency to wear through quickly, and have had a high degree of heat conductivity as a result of which the stanchion would feel unduly cold when grasped by a passenger.

An effort has heretofore been made to apply a plastic material such as cellulose acetate to stanchions by a dipping operation, but in order to obtain the desired $\frac{1}{32}$ inch in coating thickness, it has been necessary to dip the tube into the coating material, while it is in a liquid condition, then allow the tube to stand until the coating has been dried, and then repeat the dipping and drying operations about four times. Such method has been objectionable, however, not only because of the time consumed, and, therefore, the cost required, to coat the article, but also because of the fact that a uniform degree of thickness could not be obtained. Moreover, when an article is coated by repeated dipping operations, the coating comprises a laminated structure which lacks homogeneity and which is so inadherent as to crack and chip upon bending of the tube laterally to the extent normally required for use.

An object of the present invention is to provide an article having a coating of plastic material so formed thereon that a single homogeneous layer may be obtained in a single operation. My invention thereby enables a bar to be coated in a long continuous strip, whereby the material can be economically and quickly applied, and thereafter the bar or other core member may be bent to suit any desired curvature as may be required at the place of installation without damaging the coating.

Referring now to the drawings, Fig. 1 is a sectional view of an apparatus by means of which the coating of plastic material may be applied to the bar, and Figs. 2, 3 and 4 are sections taken on planes indicated by the correspondingly numbered lines in Fig. 1.

I have found that by applying a coating, such as cellulose acetate 10 to a tube, bar or other elongated article 11, in such manner that the plastic material is stretched when applied, the coating will have a uniform thickness and will adhere sufficiently to permit bending without damaging the coating. This may be obtained by heating the coating material until it has flowable characteristics and then extruding it through a die in tubular form onto the article which is moved axially of the die.

In Fig. 1 I have shown a machine which is customarily used for heating and extruding plastic material, and in general the machine includes a casing 15, a head 16, and a rotatable feed screw member 17. The members 15 and 16 are provided with cored portions 18 and 19, respectively, for the admission of steam for heating the plastic material and changing it from a powder into a semi-liquid state. Attached to the head 16 I have shown a die which includes a casing 20 and a sleeve 21, the latter of which has a passageway 22 extending therethrough, and through which the article 11 may be moved in a direction indicated by the arrow. The plastic material is caused to flow through a passageway 24 between the casing and the sleeve and be ejected in the form of a tube 25. At such point the diameter of the plastic material is larger than that of the article 11, but the arrangement is such that the article is moved at a rate faster than that at which the plastic material is ejected from the die. In this way the material is stretched as it is applied in tubular form to the article, and is adapted to adhere thereto by shrinkage during cooling.

I have found that when plastic material is applied in heated semi-fluid tubular condition as aforesaid, and is allowed to cool and harden on the article, and is stretched during the applying operation, the coating is uniform in thickness and is so adherent that a tube having an outside diameter of approximately one inch may be bent 90 degrees on a 2½ inch radius without cracking the coating, or in any way causing it to chip or flake off from the article even though the coating is $\frac{1}{32}$ inch in thickness. Thus I obtain a coating which is homogeneous throughout the extent thereof and which has a thickness of at least one per cent of the diameter of the tube.

The invention thus has provided an article of commerce of great utility and of lasting quality.

I claim:

1. An article adapted for hand rails, stanchions, supports and the like, comprising a rigid metallic tube or rod, means for preventing corrosion of the exterior surface, said means comprising an exterior layer of polymeric material which is resistant to corrosive action, said layer being adherent to said surface and having been applied in a flowable heated tubular condition and thereafter cooled to a hardened condition, said layer having a thickness in excess of .010 inch, and comprising a single, homogeneous body.

2. An article adapted for hand rails, stanchions, supports and the like, comprising a rigid metallic tube or rod, means for preventing corrosion of the exterior surface, said means comprising an exterior layer of cellulose acetate, said layer being adherent to said surface and having been applied in a flowable heated tubular condition and thereafter cooled to a hardened condition, said layer having a thickness in excess of .010 inch, and comprising a single homogeneous body.

SAMUEL D. MOORE.

REFERENCES CITED

The following references are of record in the file of this patent:

UNITED STATES PATENTS

| Number | Name | Date |
| --- | --- | --- |
| 1,479,936 | Stevens | Jan. 8, 1924 |
| 1,576,767 | Loomis | Mar. 16, 1926 |
| 1,919,455 | Wilson | July 25, 1933 |
| 2,027,961 | Currie | Jan. 14, 1936 |
| 2,262,861 | Rugeley et al. | Nov. 18, 1941 |
| 2,343,029 | Schmidt | Feb. 29, 1944 |
| 2,355,756 | Smith | Aug. 15, 1944 |

FOREIGN PATENTS

| Number | Country | Date |
| --- | --- | --- |
| 520,560 | Great Britain | Apr. 26, 1940 |